US012691558B2

(12) United States Patent
Lai et al.

(10) Patent No.: US 12,691,558 B2
(45) Date of Patent: Jul. 28, 2026

(54) SAFETY DEVICE AND ELECTRIC NAIL GUN HAVING THE SAME

(71) Applicant: BASSO INDUSTRY CORP., Taichung (TW)

(72) Inventors: Chun-Chi Lai, Taichung (TW); Jiun-Chiang Chen, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 0 days.

(21) Appl. No.: 19/194,546

(22) Filed: Apr. 30, 2025

(65) Prior Publication Data

US 2025/0345908 A1 Nov. 13, 2025

(30) Foreign Application Priority Data

May 9, 2024 (TW) ................................ 113117230

(51) Int. Cl.
*B25C 1/00* (2006.01)
*B25C 1/06* (2006.01)

(52) U.S. Cl.
CPC ................ *B25C 1/008* (2013.01); *B25C 1/06* (2013.01)

(58) Field of Classification Search
CPC ................................. B25C 1/008; B25C 1/06
See application file for complete search history.

(56) References Cited

U.S. PATENT DOCUMENTS

| | | | | |
|---|---|---|---|---|
| 8,556,148 | B2 * | 10/2013 | Schell | B25C 5/1689 227/123 |
| 2003/0019904 | A1 * | 1/2003 | Wang | B25C 1/008 227/142 |
| 2019/0217457 | A1 * | 7/2019 | Hung | B25C 1/047 |
| 2020/0189081 | A1 * | 6/2020 | Yang | B25C 1/047 |
| 2022/0234180 | A1 * | 7/2022 | Liu | B25C 1/008 |
| 2024/0091920 | A1 * | 3/2024 | Yang | B25C 1/06 |

FOREIGN PATENT DOCUMENTS

| | | | | |
|---|---|---|---|---|
| EP | 4342635 | A2 * | 3/2024 | B25C 1/06 |
| TW | I580535 | B | 5/2017 | |

* cited by examiner

*Primary Examiner* — Himchan Song
(74) *Attorney, Agent, or Firm* — Burris Law, PLLC

(57) ABSTRACT

A safety device is adapted for an electric nail gun that includes a body, a muzzle device, and a safety switch. The safety device includes a first safety member, a second safety member, and a bias unit. The first safety member is adapted to be movably mounted to the muzzle device, and includes a connection portion. The second safety member includes a limitation portion and a contact portion. The limitation portion is adapted for cooperating with the body to define a predetermined stroke and is spaced apart from the connection portion of the first safety member by a predetermined distance. The bias unit resiliently biases the first safety member and the second safety member away from the body. The first safety member is operable to move relative to the second safety member by an adjustment stroke that is shorter than the predetermined distance.

10 Claims, 8 Drawing Sheets

SAFETY DEVICE AND ELECTRIC NAIL GUN HAVING THE SAME

CROSS-REFERENCE TO RELATED APPLICATION

This application claims priority to Taiwanese Invention patent application Ser. No. 11/311,7230, filed on May 9, 2024, the entire disclosure of which is incorporated by reference herein.

FIELD

The disclosure relates to an electric nail gun, and more particularly to an electric nail gun and a safety device having an adjustment stroke.

BACKGROUND

A conventional driving tool disclosed in Taiwanese Patent No. 1580535 includes a main body portion, a driving front end portion that is connected to the main body portion, a sequence mechanism that is mounted to the main body portion and that is for triggering a nail-striking operation, a contact arm that is movably disposed between the main body portion and the driving front end portion, a magazine that is connected to the driving front end portion and that is for transporting a plurality of nails into the driving front end portion one by one, and a depth adjustment device that is mounted to the magazine, and that is for controlling a movement stroke of the contact arm so as to adjust a nail depth. The contact arm includes a front end portion that projects out of the driving front end portion, and an actuation portion that is operable to actuate the sequence mechanism, and that is spaced apart from the sequence mechanism by an alterable distance.

However, because the distance between the actuation portion of the contact arm and the sequence mechanism is not fixed, the abovementioned design of the conventional driving tool is not suitable for an electric nail gun that adopts a safety switch as the sequence mechanism to trigger the nail-striking operation, or the actuation portion of the contact arm may damage the safety switch by exerting excessive pressure on the safety switch.

SUMMARY

Therefore, an object of the disclosure is to provide a safety device that can alleviate the drawback of the prior art.

According to the disclosure, the safety device is adapted for an electric nail gun. The electric nail gun includes a body, a muzzle device that is disposed on the body, and a safety switch that is disposed on the body and that is operable for triggering a nail-striking operation. The safety device includes a first safety member, a second safety member, and a bias unit. The first safety member is adapted to be movably mounted to the muzzle device in a front-rear direction, and includes an abutment portion that is adapted to be connected to the muzzle device in an up-down direction and that is pressable, and a connection portion that is connected to the abutment portion and that is spaced apart from the muzzle device in a left-right direction. The second safety member includes a limitation portion and a contact portion that is spaced apart from the limitation portion. The limitation portion is adapted for cooperating with the body to define a predetermined stroke and is spaced apart from the connection portion of the first safety member by a predetermined distance. The first safety member is operable to urge the second safety member to move relative to the body and the safety switch by the predetermined stroke. The bias unit is adapted to be disposed between the body and the connection portion of the first safety member, and resiliently biases the first safety member and the second safety member away from the body. The first safety member is operable to move relative to the second safety member by an adjustment stroke that is shorter than the predetermined distance. The bias unit is able to be resiliently deformed by the first safety member after the second safety member is moved relative to the body and the safety switch by the predetermined stroke.

Another object of the disclosure is to provide an electric nail gun that can alleviate the drawback of the prior art.

According to the disclosure, the electric nail gun includes the safety device as mentioned above, a body, a muzzle device, and a safety switch. The muzzle device is disposed on the body. The safety switch is disposed on the body, is operable for triggering a nail-striking operation, and is located at one side of the muzzle device. The safety device is movably mounted to the muzzle device in the front-rear direction, and is convertible between an initial state and a pressed state. When the safety device is in the initial state, the contact portion of the second safety member is distal to one end of the safety switch that is distal to the second safety member, and the limitation portion of the second safety member is spaced apart from the connection portion of the first safety member by the predetermined distance. When the safety device is in the pressed state, the contact portion is proximate to the one end of the safety switch that is distal to the second safety member.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
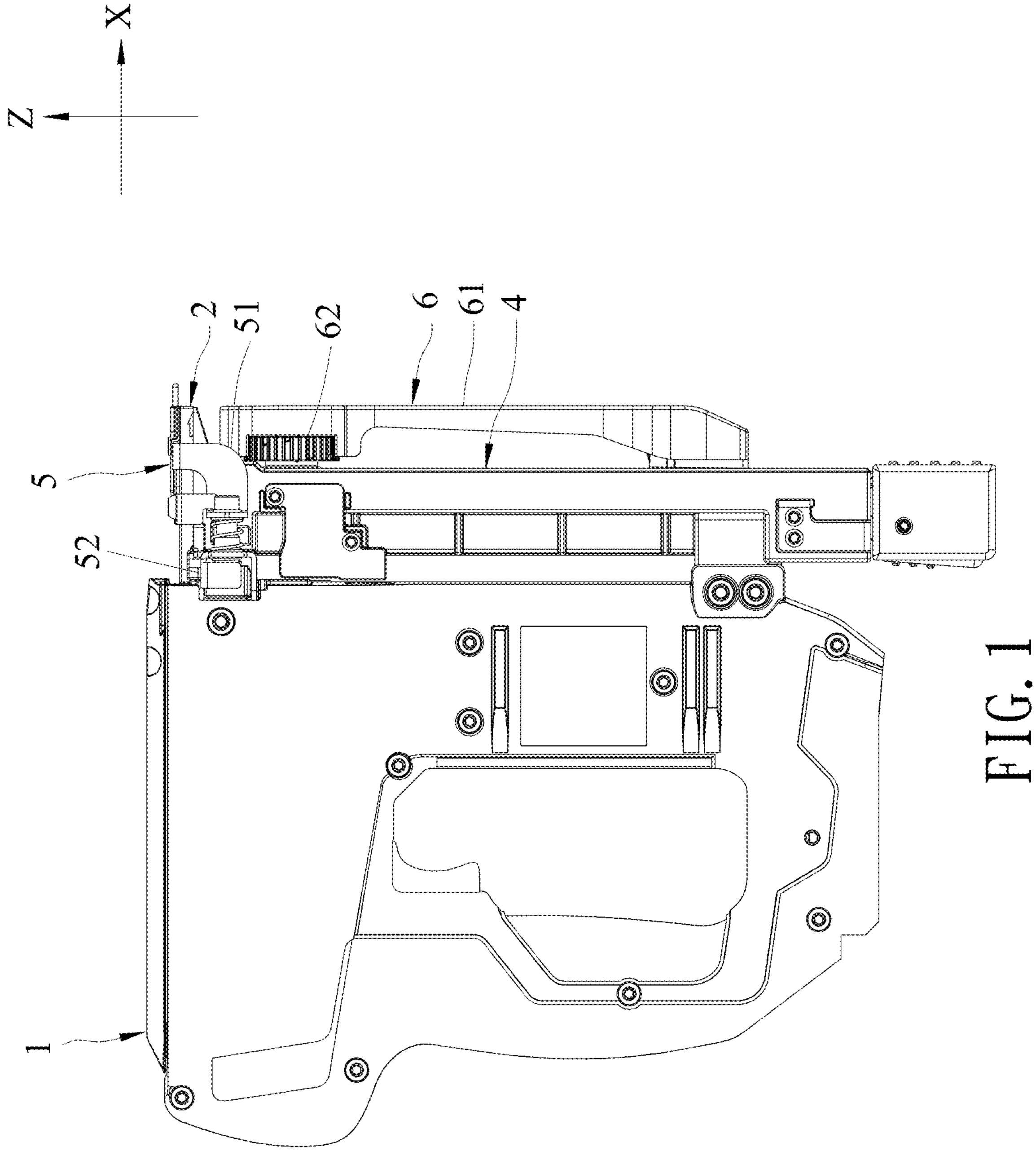
FIG. 1 is a side view of an embodiment of an electric nail gun according to the present disclosure.
Figure 2:
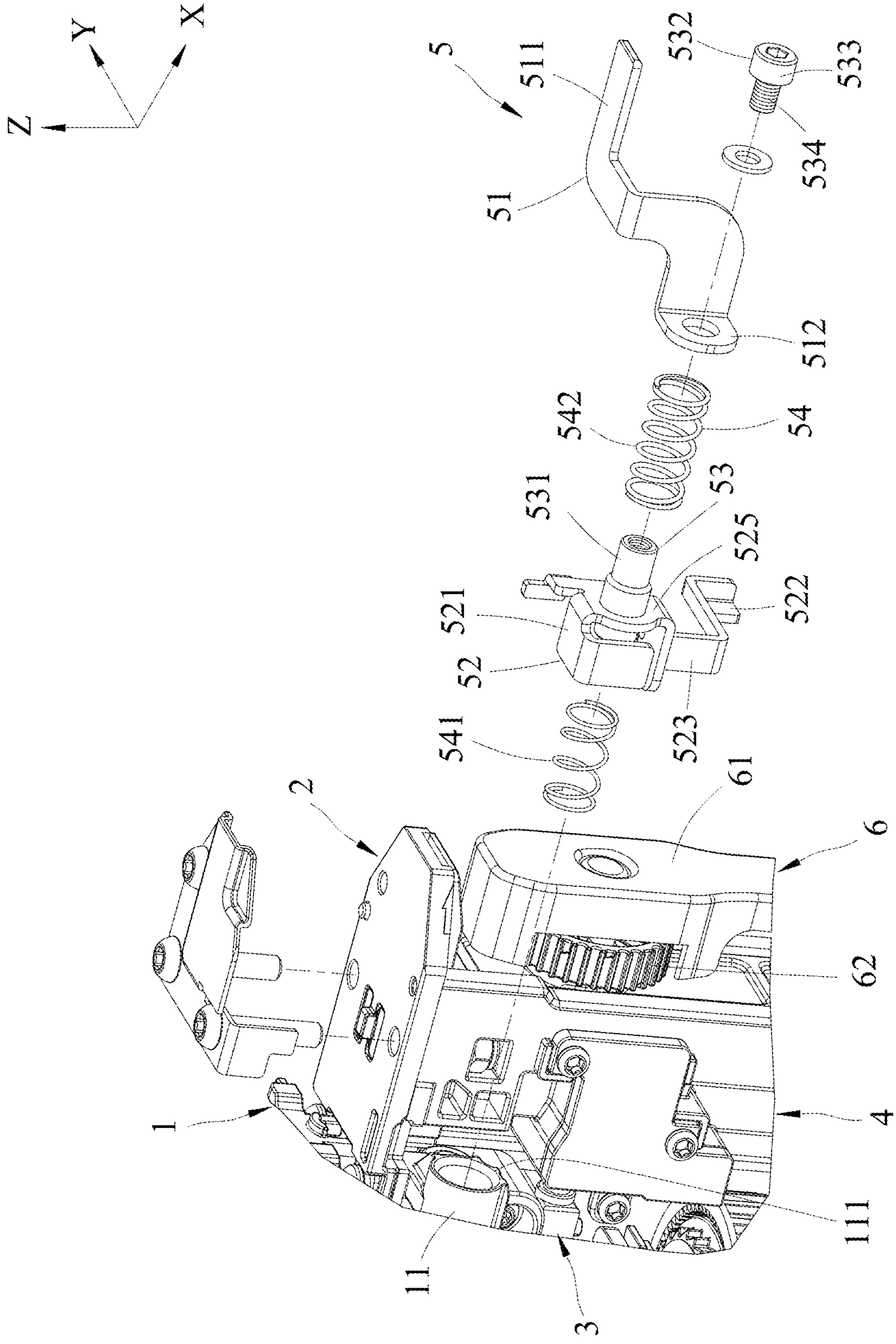
FIG. 2 is a fragmentary, partly exploded perspective view of the embodiment.

It should be noted herein that for clarity of description, spatially relative terms such as "top," "bottom," "upper,"

"lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 4, an embodiment of an electric nail gun according to the present disclosure includes a body 1, a muzzle device 2, a safety switch 3, a magazine device 4, a safety device 5, and an adjustment device 6.

The body 1 includes a sleeve member 11. The sleeve member 11 has a sleeve end 111.

The muzzle device 2 is disposed on a front end portion of the body 1 in a front-rear direction (X).

The safety switch 3 is disposed the body 1, is adjacent to the muzzle device 2, and is located at one side of the muzzle device 2. The safety switch 3 is operable for triggering a nail-striking operation.

The magazine device 4 is connected to the muzzle device 2 and the body 1, is adapted for receiving a plurality of nails (not shown) therein, and is adapted for transporting the nails into the muzzle device 2 one by one so that any one of the nails that is transported into the muzzle device 2 may be fired and leave the muzzle device 2 in the front-rear direction (X).

The safety device 5 includes a first safety member 51, a second safety member 52, a connection unit 53, and a bias unit 54.

The first safety member 51 is movably mounted to the muzzle device 2 in the front-rear direction (X), and includes an abutment portion 511 that is connected to the muzzle device 2 in an up-down direction (Z) and that is pressable, and a connection portion 512 that is connected to the abutment portion 511 and that is spaced apart from the muzzle device 2 in a left-right direction (Y). The front-rear direction (X), the up-down direction (Z), and the left-right direction (Y) are different from (e.g., perpendicular to) each other.

The second safety member 52 includes a limitation portion 521, a contact portion 522 that is spaced apart from the limitation portion 521 along the up-down direction (Z) and that faces the safety switch 3, and an extension portion 523 that extends in the up-down direction Z and that interconnects the limitation portion 521 and the contact portion 522. The limitation portion 521 has a limitation surface 524 that faces the body 1, and an abutment surface 525 that is opposite to the limitation surface 524. The limitation surface 524 cooperates with the sleeve end 111 of the sleeve member 11 to define a predetermined stroke (L1). The abutment surface 525 is spaced apart from a surface of the connection portion 512 of the first safety member 51 that faces the abutment surface 525 by a predetermined distance (D).

Figure 4:
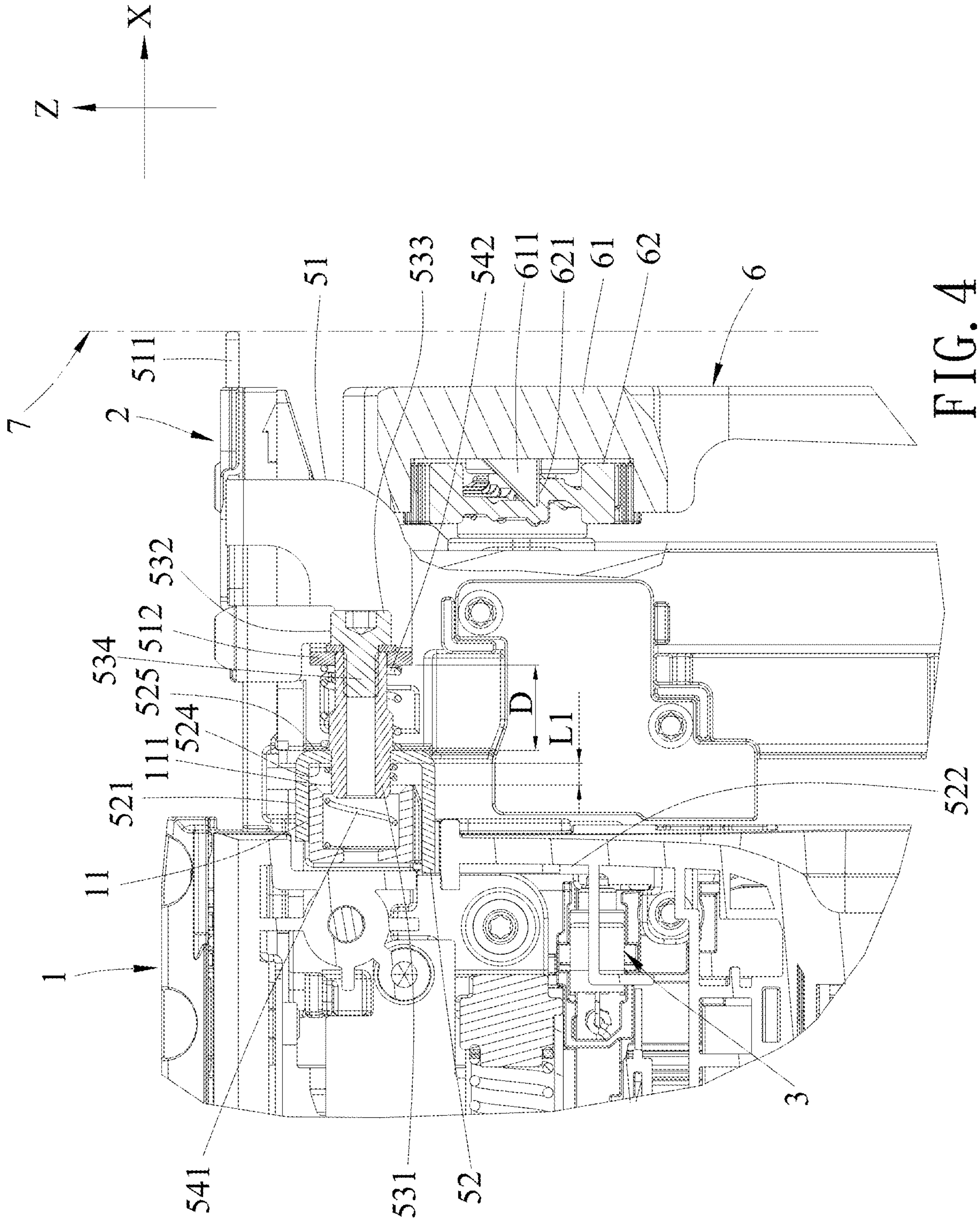
FIG. 4 is a fragmentary sectional view taken along line IV-IV in FIG. 3, illustrating a separation member of the embodiment in a deep nail-striking position.
Figure 5:
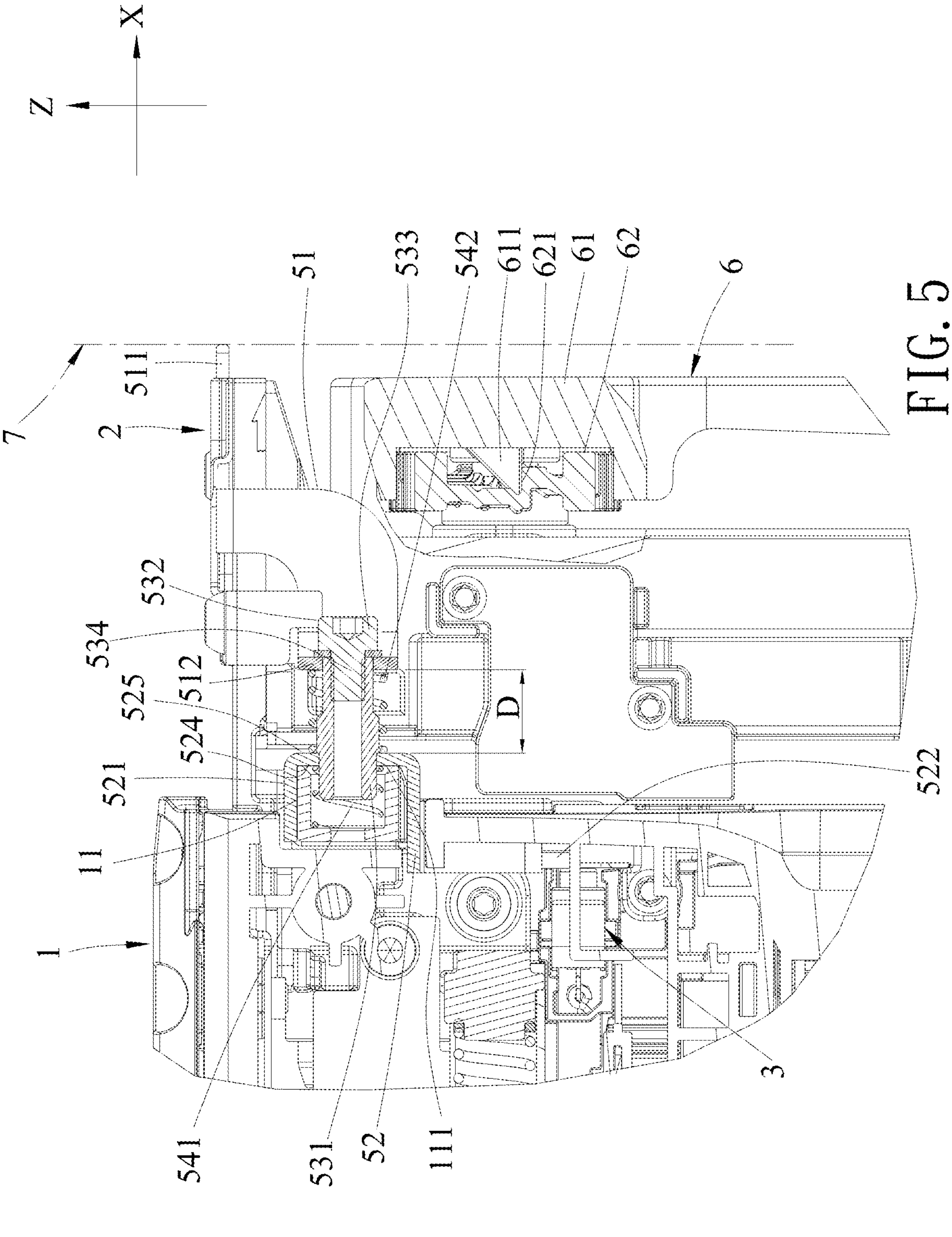
FIG. 5 is a view similar to FIG. 4, but illustrating that, with respect to a configuration as illustrated in FIG. 4, a first safety member and a second safety member of the embodiment are moved by a predetermined stroke.
Figure 6:
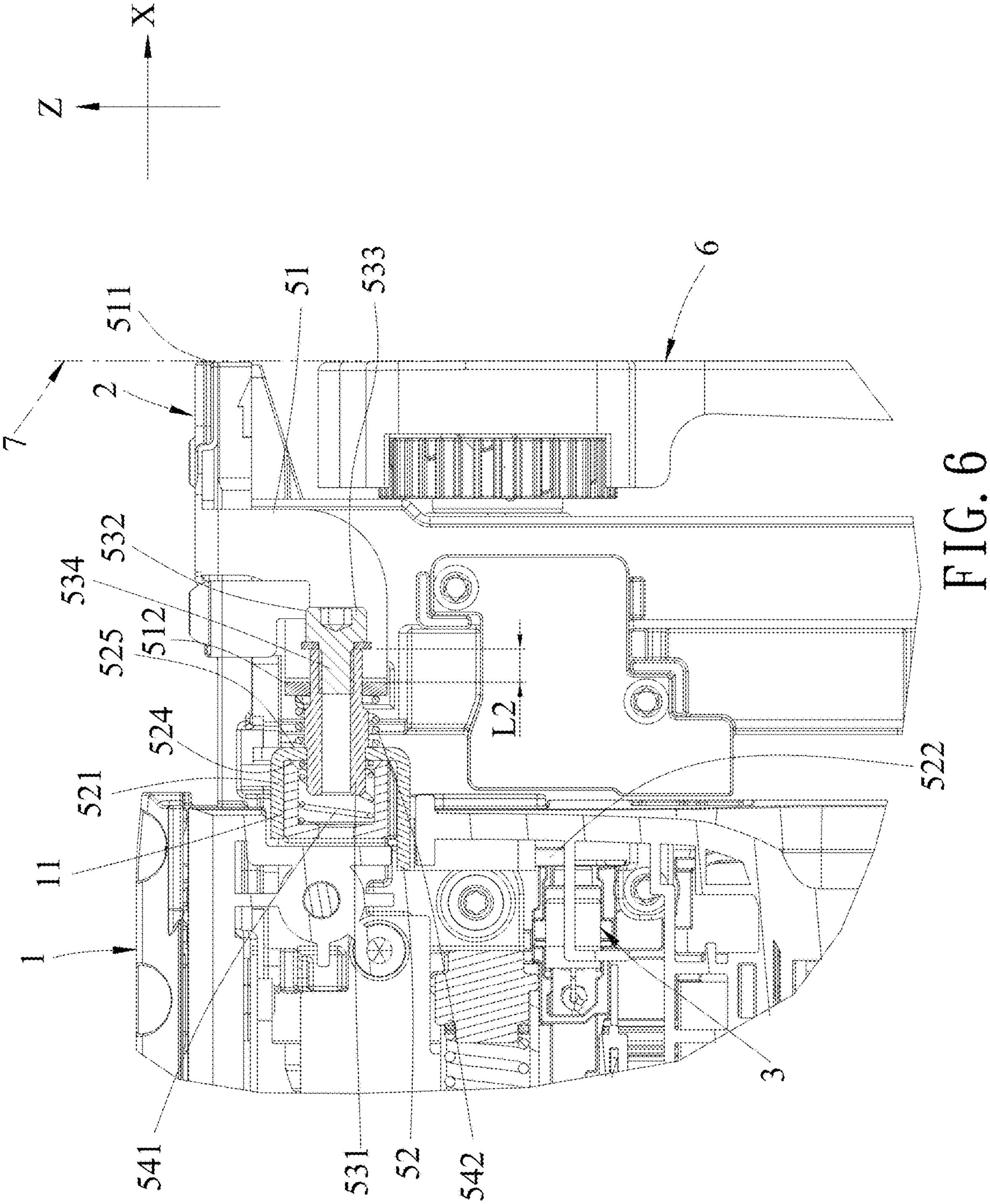
FIG. 6 is a view similar to FIG. 5, but illustrating that, with respect to a configuration as illustrated in FIG. 5, the first safety member is moved relative to the second safety member by an adjustment stroke and is located in a first adjustment position.

Referring to FIGS. 2, and 4 to 6, the first safety member 51 is operable to urge the second safety member 52 to move relative to the sleeve member 11 of the body 1 and the safety switch 3 by the predetermined stroke (L1). The limitation surface 524 abuts against the sleeve end 111 of the sleeve member 11 after the second safety member 52 is moved toward the body 1 by the predetermined stroke (L1). When the limitation surface 524 abuts against the sleeve end 111 of the sleeve member 11, the contact portion 522 operates (e.g., actuates or pushes) the safety switch 3. Referring to FIG. 6, the first safety member 51 is further operable to move relative to the second safety member 52 by an adjustment stroke (L2) that is shorter than the predetermined distance (D).

The connection unit 53 includes a connection rod 531, and a bolt member 532 that threadedly engages the connection rod 531. The connection rod 531 is connected to the limitation portion 521 of the second safety member 52, and extends through the connection portion 512 of the first safety member 51 in the front-rear direction (X) so that the connection portion 512 of the first safety member 51 is movable along the connection rod 531 in the front-rear direction (X). The bolt member 532 has a bolt head 533 for limiting movement of the connection portion 512 of the first safety member 51, and a bolt rod 534 that extends through the connection portion 512 of the first safety member 51 and that threadedly engages the connection rod 531. In some embodiments, the bolt head 533 may abut against the connection portion 512 of the first safety member 51. In some embodiments, the connection unit 53 may further include a washer that is disposed between the bolt head 533 and the connection portion 512 of the first safety member 51.

The bias unit 54 is disposed between the body 1 and the connection portion 512 of the first safety member 51, and resiliently biases the first safety member 51 and the second safety member 52 away from the body 1. The bias unit 54 includes a first bias member 541 and a second bias member 542. The first bias member 541 extends into and is disposed in the sleeve member 11, is sleeved on the connection rod 531, and has two opposite ends. One of the opposite ends of the first bias member 541 abuts against the body 1. Another one of the opposite ends of the first bias member 541 abuts against one of the connection rod 531 and the limitation portion 521 of the second safety member 52. In this embodiment, the opposite ends of the first bias member 541 respectively abuts against the sleeve member 11 and the limitation surface 524 of the limitation portion 521 of the second safety member 52. In some embodiments, the first bias member 541 may surround the sleeve member 11 (e.g., may be sleeved on the sleeve member 11), and the opposite ends of the first bias member 541 may respectively abut against the body 1 (e.g., a portion of the body 1 different from the sleeve member 11) and a peripheral surface of the limitation portion 521 that faces the body 1 and that surrounds the sleeve member 11. The second bias member 542 is sleeved on the connection rod 531 (i.e., the connection rod 531 extends through the second bias member 542), and has two opposite ends that respectively abut against the abutment surface 525 of the limitation portion 521 of the second safety member 52 and the connection portion 512 of the first safety member 51. The first bias member 541 is resiliently deformable, and generates a first biasing force when the first bias member 541 is resiliently deformed. The second bias member 542 is resiliently deformable, and is able to generate a second biasing force that is greater than the first biasing force when the second bias member 542 is resiliently deformed. Specifically, the limitation surface 524 abuts against the sleeve end 111 of the sleeve member 11 after the second safety member 52 is moved toward the body 1 by the predetermined stroke (L1). When the limitation surface 524 abuts against the sleeve end 111 of the sleeve member 11, the contact portion 522 operates (e.g., actuates or pushes) the safety switch 3. Referring to FIGS. 5 and 6, the first safety member 51 is further operable to move relative to the second safety member 52 by an adjustment stroke (L2) that is shorter than the predetermined distance (D). In this embodiment, at least one of the first bias member 541 and the second bias member 542 is configured to be a resilient member.

It is noted that, in this embodiment, the first bias member 541 is located between the sleeve member 11 and the connection rod 531, and the opposite ends thereof respectively abut against the sleeve member 11 and the limitation surface 524 of the limitation portion 521 of the second safety member 52. However, in some embodiments, the first bias member 541 may be spaced apart from the connection rod 531 and may be located between the sleeve member 11 and the limitation portion 521 of the second safety member 52, and the opposite ends thereof may respectively abut against the body 1 (e.g., a portion of the body 1 different from the sleeve member 11) and the limitation surface 524 of the limitation portion 521.

The adjustment device 6 is connected to the magazine device 4, and includes a separation member 61 that is movable relative to the body 1 in the front-rear direction (X), and an adjustment member 62 that positions the separation member 61. In this embodiment, the separation member 61 is biased toward the body 1 by an elastic force when the separation member 61 is urged to move away from the body 1 (e.g., a tension spring [not shown] is disposed between the adjustment member 62 and the separation member 61 to resiliently bias the separation member 61 toward the body 1). The separation member 61 has two protrusions 611 (only one is visible in each of FIGS. 4 and 5 due to a viewing angle) that protrude toward the adjustment member 62. The adjustment member 62 is configured to be a rotary plate, and has a plurality of recessed portions 621 (only one is visible in each of FIGS. 4 and 5 due to the viewing angle) that are arranged circumferentially and that open toward the separation member 61 in the front-rear direction (X). The protrusions 611 are operable to respectively engage any two of the recessed portions 621. The recessed portions 621 have at least two different depths in the front-rear direction (X). Therefore, by virtue of the separation member 61 being biased toward the body 1 by the elastic force and by virtue of the recessed portions 621 having the different depths, the separation member 61 is movable relative to the body 1 between a deep nail-striking position (see FIG. 4) and a shallow nail-striking position (see FIG. 7) when the protrusions 611 thereof that engage two of the recessed portions 621 at one depth are urged to engage another two of the recessed portions 621 at another depth.

With reference to FIG. 4, when the separation member 61 is in the deep nail-striking position, the separation member 61 is proximate to the body 1. Referring to FIGS. 4 and 6, the electric nail gun is urged to move in the front-rear direction (X) toward a work surface 7 of an object until the abutment portion 511 of the first safety member 51 abuts against the work surface 7 of the object. Then, the abutment portion 511 is pressed against the work surface 7 so that the body 1, the muzzle device 2, the safety switch 3, the magazine device 4 (see FIG. 1), and the adjustment device 6 are urged to move in the front-rear direction (X) toward the work surface 7. When the separation member 61 abuts against the work surface 7, movement of the electric nail gun relative to the work surface 7 is stopped. At this time, the abutment portion 511 is retracted into the body 1 and the first safety member 51 is located in a first retracted position (see FIG. 6).

Figure 7:
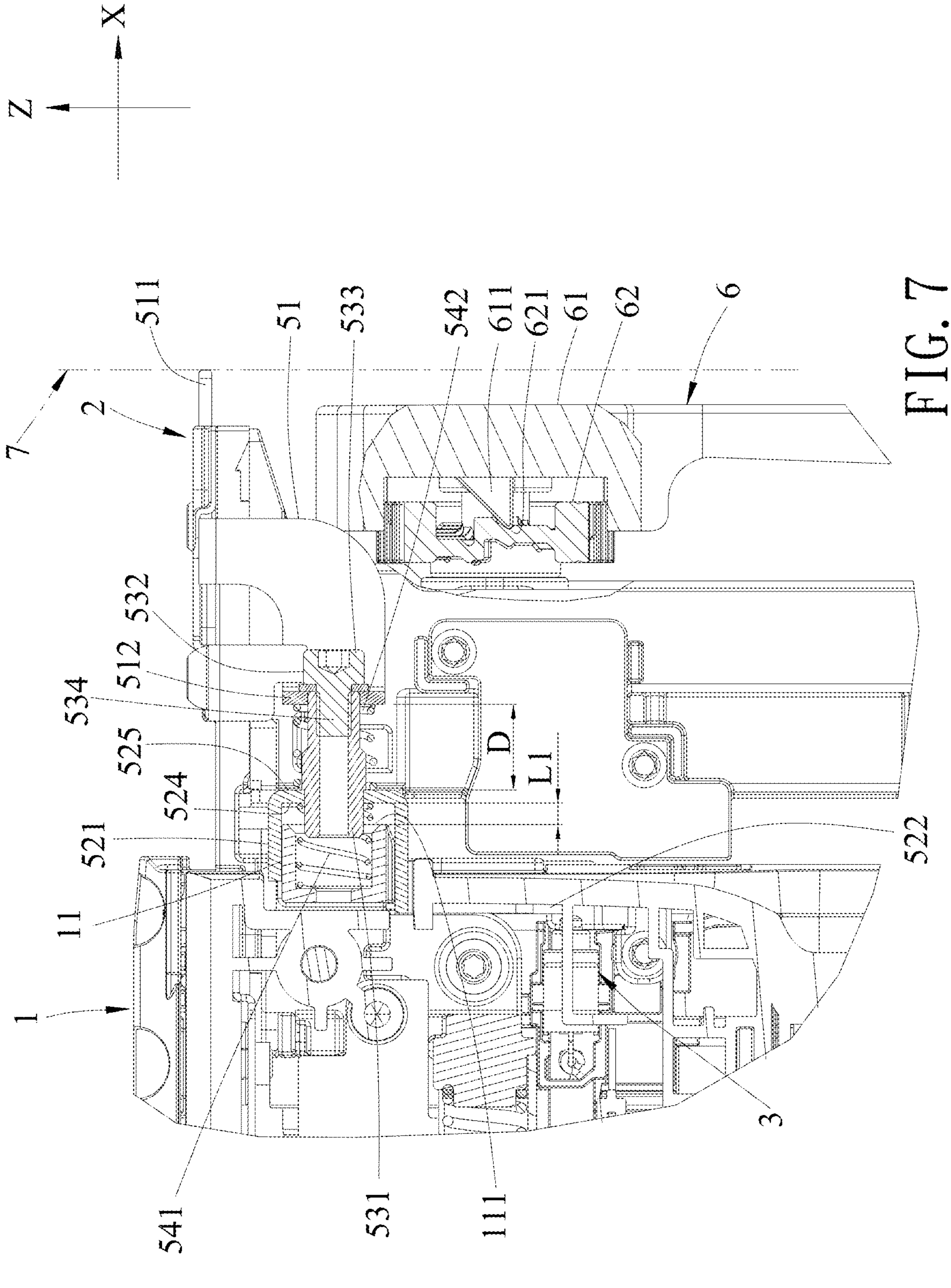
FIG. 7 is a fragmentary sectional view illustrating the separation member in a shallow nail-striking position.
Figure 8:
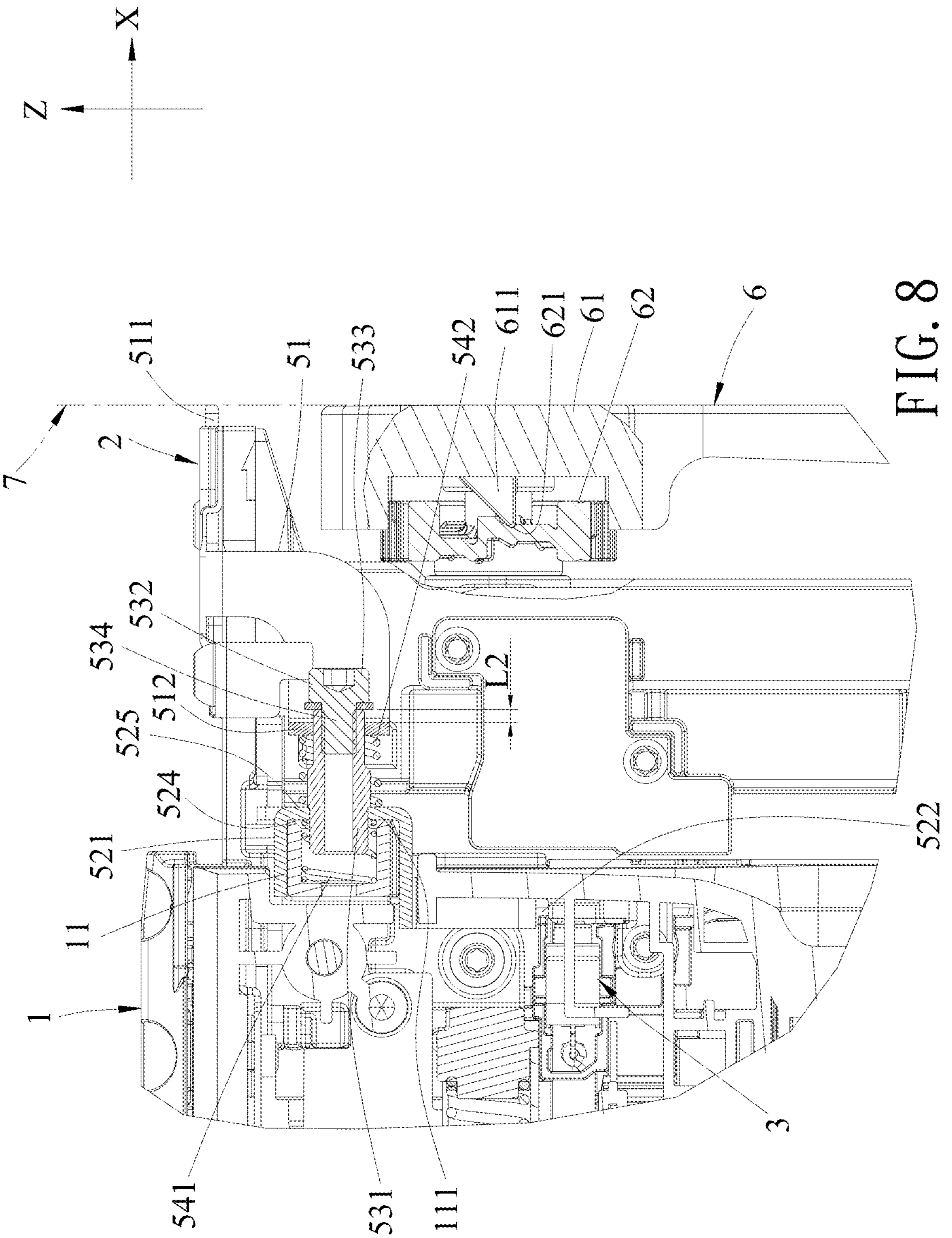
FIG. 8 is a view similar to FIG. 7, but illustrating that, with respect to a configuration as illustrated in FIG. 7, the first safety member and the second safety member are moved by the predetermined stroke, and the first safety member is moved relative to the second safety member by the adjustment stroke and is located in a second adjustment position.

With reference to FIG. 7, when the separation member 61 is in the shallow nail-striking position, the separation member 61 is distal to the body 1. Referring to FIGS. 7 and 8, when the abutment portion 511 of the first safety member 51 abuts against the work surface 7 of the object and when the electric nail gun is urged to move toward the work surface 7 in the front-rear direction (X), because a distance between the separation member 61 and the work surface 7 when the separation member 61 is in the shallow nail-striking position is shorter than a distance between the separation member 61 and the work surface 7 when the separation member 61 is in the deep nail-striking position, the time required for the separation member 61 to abut against the work surface 7 is shorter than the time required for the separation member 61 in the deep nail-striking position to abut against the work surface 7. When the separation member 61 abuts against the work surface 7, movement of the electric nail gun relative to the work surface 7 is stopped. At this time, an extent to which the abutment portion 511 retracts into the body 1 is less than that illustrated in FIGS. 4 to 6 such that the first safety member 51 is located in a second retracted position (see FIG. 8). Therefore, the connection portion 512 in the first retracted position is closer to the body 1 than the connection portion 512 in the second retracted position.

Referring to FIGS. 4 and 5, when the abutment portion 511 of the first safety member 51 abuts against the work surface 7 of the object and when the electric nail gun is urged to move toward the work surface 7 in the front-rear direction (X), each of the first bias member 541 and the second bias member 542 is resiliently deformed, and the first biasing force is equal to the second biasing force. In some embodiments, a force constant of the second bias member 542 may be much greater than a force constant of the first bias member 541 so that a displacement of the second bias member 542 is much smaller than a displacement of the first bias member 541 and may be neglected. Referring to FIGS. 4 and 5 again, at this time, the connection portion 512 of the first safety member 51 pushes the second bias member 542 toward the second safety member 52 such that the second bias member 542 urges the limitation portion 521 of the second safety member 52 to push the first bias member 541 toward the sleeve member 11. Thus, the first bias member 541 is compressed, and, after the second safety member 52 is urged to move relative to the body 1 and the safety switch 3 by the predetermined stroke (L1), the limitation surface 524 of the second safety member 52 abuts against the sleeve end 111 of the sleeve member 11 and the contact portion 522 of the second safety member 52 operates the safety switch 3.

Referring to FIGS. 5 and 6, afterwards, when the electric nail gun continues to move toward the work surface 7 in the front-rear direction (X), because the second safety member 52 is not movable relative to the body 1, the first safety member 51 is urged to move relative to the second safety member 52 by the adjustment stroke (L2), and the second bias member 542 is further compressed by the first safety member 51 and the second safety member 52 in the front-rear direction (X) (the second biasing force is larger than the first biasing force during the compression of the second bias member 542) until the separation member 61 abuts against the work surface 7. At this time, the first safety member 51 is in the first retracted position.

Referring to FIGS. 6 and 8, after the second safety member 52 is moved relative to the body 1 and the safety switch 3 by the predetermined stroke (L1), the second bias member 542 is still able to be resiliently deformed by the first safety member 51 that is urged to move relative to the second safety member 52 by the adjustment stroke (L2). According to the preceding description, the safety device 5 is convertible between an initial state (see FIGS. 4 and 7) and a pressed state (see FIGS. 6 and 8). When the safety device 5 is in the initial state, the contact portion 522 of the second safety member 52 is distal to one end of the safety switch 3 that is distal to the second safety member 52, and is spaced apart from the connection portion 512 of the first safety member 51 by the predetermined distance (D). When the safety device 5 is in the pressed state, the contact portion 522 is proximate to the one end of the safety switch 3 that is distal to the second safety member 52. When the safety device 5 is converted from the initial state to the pressed state, the first safety member 51 is moved relative to the body 1 by a distance that is equal to a sum of the adjustment stroke (L2) and the predetermined stroke (L1), and the second safety member 52 is moved relative to the body 1 by the predetermined stroke (L1). The adjustment stroke (L2) during conversion of the safety device 5 from the initial state to the pressed state when the separation member 61 is in the deep nail-striking position is greater than the adjustment stroke (L2) during conversion of the safety device 5 from the initial state to the pressed state when the separation member 61 is in the shallow nail-striking position such that the distance by which the first safety member 51 is moved when the separation member 61 is in the deep nail-striking position is longer than the distance by which the first safety member 51 is moved when the separation member 61 is in the shallow nail-striking position. Hence, by changing a location of the first safety member 51 (e.g., the first retracted position [see FIG. 6] or the second retracted position [see FIG. 8]), a distance between the muzzle device 2 and the work surface 7 of the object in the front-rear direction (X) is adjustable, thereby achieving the purpose of adjusting a nail depth in the object.

In this embodiment, when the contact portion 522 operates (e.g., actuates or pushes) the safety switch 3, the safety switch 3 is pressed and outputs a safety signal for triggering the nail-striking operation. It is noted that, the electric nail gun of this disclosure is capable of starting the nail-striking operation according to the safety signal and a switch signal. There will be no further description for the nail-striking operation since the relevant mechanism is widely-understood by those skilled in the art and the relevant features of this disclosure do not concern the specific configuration of the nail-striking operation.

Figure 3:
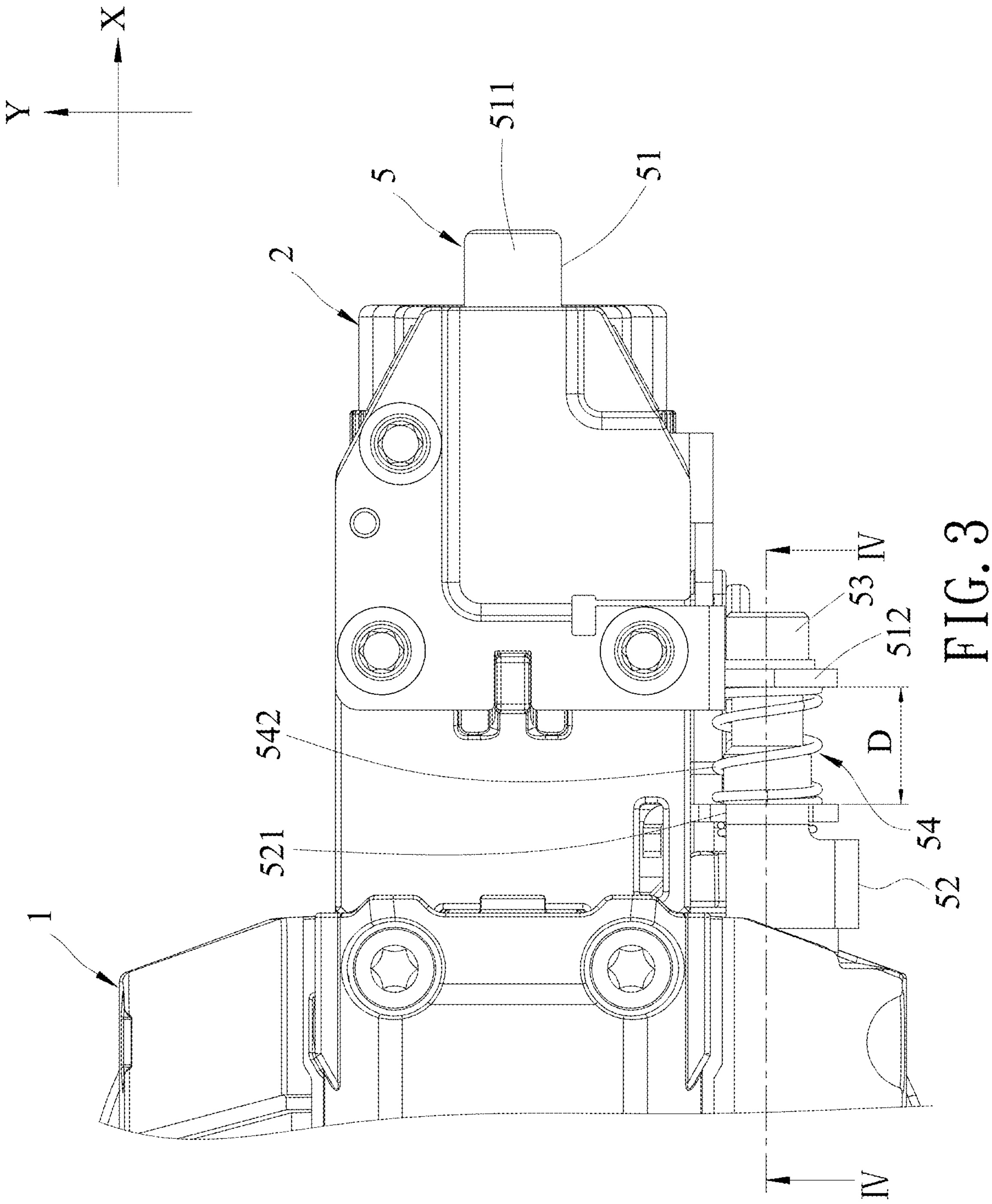
FIG. 3 is a fragmentary top view of the embodiment.

Through the above description, advantages of the electric nail gun according to the present disclosure can be summarized as follows:

1. By virtue of the separation member 61 being movable relative to the body 1 between the deep nail-striking position and the shallow nail-striking position, the nail depth is adjustable. In addition, no matter which position the separation member 61 is in, the second safety member 52 is movable relative to the safety switch 3 only by the predetermined stroke (L1), and the predetermined stroke (L1) is fixed. Therefore, when the contact portion 522 of the second safety member 52 presses against the safety switch 3, a pressure that is exerted on the safety switch 3 is predetermined and fixed, thereby preventing the safety switch 3 from an excessive pressure, and increasing a service life of the safety switch 3.
2. Referring to FIG. 3, by virtue of the connection portion 512 of the first safety member 51, the second safety member 52, and the bias unit 54 being located at one side of the muzzle device 2 in the left-right direction (Y), a structure of peripheral components around the muzzle device 2 may be simplified, and a height of the muzzle device 2 and the peripheral components that is measured in the up-down direction (Z) may be reduced so that the line of sight of a user of the electric nail gun may not be blocked during the nail-striking operation.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A safety device adapted to an electric nail gun, the electric nail gun including a body, a muzzle device that is disposed on the body, and a safety switch that is disposed on the body and that is operable for triggering a nail-striking operation, the safety device comprising:

a first safety member adapted to be movably mounted to the muzzle device in a front-rear direction, and including an abutment portion that is adapted to be connected to the muzzle device in an up-down direction and that is pressable, and a connection portion that is connected to the abutment portion and that is spaced apart from the muzzle device in a left-right direction;

a second safety member including a limitation portion and a contact portion that is spaced apart from the limitation portion, the limitation portion being adapted for cooperating with the body to define a predetermined stroke and being spaced apart from the connection portion of the first safety member by a predetermined distance, the first safety member being operable to urge the second safety member to move relative to the body and the safety switch by the predetermined stroke; and a bias unit adapted to be disposed between the body and the connection portion of the first safety member, and resiliently biasing the first safety member and the second safety member away from the body, the first safety member being operable to move relative to the second safety member by an adjustment stroke that is shorter than the predetermined distance, the bias unit being able to be resiliently deformed by the first safety member after the second safety member is moved relative to the body and the safety switch by the predetermined stroke.

2. The safety device as claimed in claim 1, further comprising a connection unit, the connection unit including a connection rod that is connected to the limitation portion of the second safety member and that extends through the bias unit and the connection portion of the first safety member in the front-rear direction so that the connection portion of the first safety member is movable along the connection rod in the front-rear direction.

3. The safety device as claimed in claim 2, wherein the connection unit further includes a bolt member that has a bolt head for limiting movement of the connection portion of the first safety member, and a bolt rod that extends through the connection portion of the first safety member and that threadedly engages the connection rod.

4. The safety device as claimed in claim 3, wherein the bias unit includes a first bias member that has two opposite ends, and a second bias member that is sleeved on the connection rod and that has two opposite ends respectively abutting against the limitation portion of the second safety member and the connection portion of the first safety member, one of the opposite ends of the first bias member being adapted to abut against the body, another one of the opposite ends of the first bias member abutting against one of the connection rod and the limitation portion of the second safety member, the first bias member being resiliently deformable, and generating a first biasing force when the first bias member is resiliently deformed, the second bias member being resiliently deformable, and being able to generate a second biasing force that is greater than the first biasing force when the second bias member is resiliently deformed.

5. The safety device as claimed in claim 4, the body including a sleeve member that has a sleeve end, wherein the limitation portion of the second safety member has a limitation surface that is adapted for facing the body, the opposite ends of the first bias member being adapted for respectively abutting against the sleeve member and the limitation surface of the second safety member, the predetermined stroke being defined between the limitation surface and the sleeve end of the sleeve member, the limitation surface abutting against the body after the second safety member is moved toward the body by the predetermined stroke.

6. The safety device as claimed in claim 1, wherein the contact portion of the second safety member is spaced apart from the limitation portion of the second safety member along the up-down direction, the second safety member further including an extension portion that extends along the up-down direction and that interconnects the limitation portion and the contact portion thereof.

7. An electric nail gun comprising:

a body;

a muzzle device disposed on the body;

a safety switch disposed on the body, operable for triggering a nail-striking operation, and located at one side of the muzzle device; and the safety device as claimed in claim 1, the safety device being movably mounted to the muzzle device in the front-rear direction, and being convertible between an initial state and a pressed state, the contact portion of the second safety member being distal to one end of the safety switch that is distal to the second safety member and the limitation portion of the second safety member being spaced apart from the connection portion of the first safety member by the predetermined distance when the safety device is in the initial state, the contact portion being proximate to the one end of the safety switch that is distal to the second safety member when the safety device is in the pressed state.

8. The electric nail gun as claimed in claim 7, wherein, when the safety device is converted from the initial state to the pressed state, the first safety member is moved relative to the body by a distance that is equal to a sum of the adjustment stroke and the predetermined stroke, and the second safety member is moved relative to the body by the predetermined stroke.

9. The electric nail gun as claimed in claim 8, further comprising an adjustment device, the adjustment device including a separation member that is movable relative to the body in the front-rear direction, and an adjustment member that positions the separation member, the separation member being movable relative to the body between a deep nail-striking position and a shallow nail-striking position, the separation member being proximate to the body when the separation member is in the deep nail-striking position, the separation member being distal to the body when the separation member is in the shallow nail-striking position, the adjustment stroke during conversion of the safety device from the initial state to the pressed state when the separation member is in the deep nail-striking position being greater than the adjustment stroke during conversion of the safety device from the initial state to the pressed state when the separation member is in the shallow nail-striking position such that the distance by which the first safety member is moved when the separation member is in the deep nail-striking position is longer than the distance by which the first safety member is moved when the separation member is in the shallow nail-striking position.

10. The electric nail gun as claimed in claim 9, further comprising a magazine device that is connected to the muzzle device and the body, and that is adapted for receiving a plurality of nails therein and for transporting the plurality of nails into the muzzle device one by one, the adjustment device being connected to the magazine device, the separation member having at least one protrusion that protrudes toward the adjustment member, the adjustment member having a plurality of recessed portions that open toward the separation member in the front-rear direction and that have at least two different depths in the front-rear direction, the at least one protrusion being operable to engage at least one of the plurality of recessed portions.

* * * * *